(12) United States Patent
Ferroussat

(10) Patent No.: US 7,111,033 B2
(45) Date of Patent: Sep. 19, 2006

(54) CARRY SAVE ADDERS

(75) Inventor: Sebastien Ferroussat, Fontaine (FR)

(73) Assignee: STMicroelectronics S.A., Gentilly (FR)

( * ) Notice: Subject to any disclaimer, the term of this patent is extended or adjusted under 35 U.S.C. 154(b) by 495 days.

(21) Appl. No.: 09/919,495

(22) Filed: Jul. 30, 2001

(65) Prior Publication Data

US 2002/0038327 A1 Mar. 28, 2002

(30) Foreign Application Priority Data

Aug. 1, 2000 (EP) ................................ 00410092.1

(51) Int. Cl.
*G06F 7/52* (2006.01)
*G06F 7/50* (2006.01)

(52) U.S. Cl. ...................... 708/629; 708/708
(58) Field of Classification Search ........ 708/629–630, 708/708
See application file for complete search history.

(56) References Cited

U.S. PATENT DOCUMENTS

| 4,604,723 A | | 8/1986 | Burrows | |
|---|---|---|---|---|
| 4,769,780 A | * | 9/1988 | Chang | 708/629 |
| 4,901,270 A | * | 2/1990 | Galbi et al. | 708/708 |
| 5,343,416 A | * | 8/1994 | Eisig et al. | 708/625 |
| 5,347,482 A | * | 9/1994 | Williams | 708/625 |
| 5,497,342 A | * | 3/1996 | Mou et al. | 708/708 |
| 5,808,928 A | * | 9/1998 | Miyoshi | 708/628 |
| 5,978,827 A | * | 11/1999 | Ichikawa | 708/709 |
| 6,018,758 A | * | 1/2000 | Griesbach et al. | 708/606 |
| 6,442,582 B1 | * | 8/2002 | Hale | 708/629 |
| 6,615,229 B1 | * | 9/2003 | Vijayrao et al. | 708/629 |
| 2002/0073127 A1 | * | 6/2002 | Hossain | 708/210 |

OTHER PUBLICATIONS

European Search Report from European Patent Application 00410092.1 filed Aug. 1, 2000.
Mayur Mehta et al. "High-Speed Multiplier Design Using Multi-Input Counter And Compressor Circuits" Proceedings of the Symposium on Computer Arithmetic, US, Los Alamitos, IEEE Comp. Soc. Press, vol. SYMP. 10, Jun. 26, 1991, pp. 43-50, XP000222157.
Norio Ohkubo et al. "A 4.4 NS CMOS 54 X 54-B Multiplier Using Pass-Transistor Multiplexer" IEEE Journal of Solid-State Circuits, US IEEE Inc., New York, vol. 30, No. 3, Mar. 1, 1995, pp. 251-256, XP000502811.

\* cited by examiner

*Primary Examiner*—Tan V. Mai
(74) *Attorney, Agent, or Firm*—Lisa K. Jorgenson; James H. Morris; Wolf, Greenfield & Sacks, P.C.

(57) ABSTRACT

A carry save adder circuit for reducing the number of inputs to a lower number of outputs, the carry save adder circuit including four carry save adders, the four carry save adders being arranged in two layers with the first and second carry save adders being arranged in a first of said layers and the third and fourth carry save adders being arranged in a second of the layers, said third and fourth carry save adders being arranged to provide the outputs, the third and fourth carry save adders each receiving at least one output from each of the first and second carry save adders and the first and second carry save adders being arranged to receive at least some of the inputs.

21 Claims, 6 Drawing Sheets

CARRY SAVE ADDERS

FIELD OF THE INVENTION

The present invention relates to carry save adders and in particular but not exclusively to carry save adders which are able to reduce the number of partial products to two.

BACKGROUND TO THE INVENTION

In digital arithmetic, partial products are obtained when two numbers are multiplied together. The number of partial products will depend on the method used for obtaining the partial products. In a conventional operation, the number of partial products may be equal to the number of bits in the multiplier. However, techniques such as Booth encoding make it possible to reduce the number of partial products obtained. For example Booth coding allows the number of partial products to be reduced by a factor of 2. The Booth encoding method is sometimes referred to as the Booth-MacSorley algorithm.

In the Booth coding method, a triplet of bits of the multiplier is input to a Booth coder which provides three outputs, the values of which depends on the input values. The outputs of the Booth coder are then used to modify bits of the number to be multiplied by the multiplier.

Carry save adders which reduce three partial products to two partial products are known. This type of carry save adder is sometimes referred to as a 3 to 2 carry save adder. Such a carry save adder is in fact a full adder. A full adder is a binary logic circuit which produces a two-bit sum where one bit represents the sum and the other bit represents the carry when three one bit binary numbers are added together. The three one bit numbers may be corresponding bits from three partial products.

Carry save adders which reduce four partial products to two partial products are also known. This type of carry save adder is known as a 4 to 2 carry save adder. One example of such a carry save adder is shown in the IEEE Journal of Solid State circuits, Vol 30, No 3, March 1995: "A 4.4 ns CMOS 54×54-b using pass-transistor multiplexer", page 251 to 257, N Ohkubo et al. This structure generally yields faster partial product compression than the use of 3 to 2 carry save adders. The 4 to 2 carry save adder actually compresses five partial products into three and is therefore sometimes referred to as a 5 to 3 carry save adder. This carry save adder is connected in such a way that four of the inputs are corresponding bits from four partial products whilst the fifth input is fed from a neighbouring adder and is known as the "carry in". The output of this carry save adder consists of one sum bet and two carry bits. One of these carry bits is input to a neighbouring carry save adder and forms one of the five inputs of that carry save adder.

SUMMARY OF THE INVENTION

It is an aim of embodiments of the present invention to provide a carry save adder unit which is capable of compressing more than five inputs to a smaller number of outputs.

According to one aspect of the present invention, there is provided a carry save adder for reducing the number of inputs to a lower number of outputs, said carry save adder comprising four carry save adders, said four carry save adders being arranged in two layers with the first and second carry save adders being arranged in a first of said layers and the third and fourth carry save adders being arranged in a second of said layers, said third and fourth carry save adders being arranged to provide said outputs, said third and fourth carry save adders each receiving at least one output from each of said first and second carry save adders and the first and second carry save adders being arranged to receive at least some of said inputs.

This arrangement permits a relatively short routing between the carry save adders to be achieved. This may also improve timing.

At least one of the inputs may be input to at least one of the third and fourth carry save adders.

The carry save adder circuit may be a 9 to 4 carry save adder circuit. The first carry save adder may be a 5 to 3 carry save adder and the second, third and fourth carry save adders may be 3 to 2 carry save adders. The first to fifth inputs may be input to the first carry save adder and the sixth to eighth inputs may be provided to the second carry save adder. The ninth input may be input directly to one of the third and fourth carry save adders.

The carry save adder circuit may alternatively be a 7 to 4 carry save adder circuit. The first to third carry save adders may be 3 to 2 carry save adders and the fourth carry save adder may be a half adder. The first to third inputs may be input to the first carry save adder and the fourth to sixth inputs may be provided to the second carry save adder. The seventh input may be input directly to one of the third and fourth carry save adders.

According to a second aspect of the present invention there is provided a carry save adder circuit for reducing nine inputs to four outputs, said carry save adder circuit comprising four carry save adders, the first carry save adder being a 5 to 3 carry save unit and the second, third and fourth carry save adders being 3 to 2 carry save adders.

According to a third aspect of the present invention there is provided a carry save adder circuit for reducing seven inputs to four outputs, said carry save adder circuit comprising four carry save adders, the first, second and third carry save adders being 3 to 2 carry save adders and the fourth carry save unit being a half adder.

According to a fourth aspect of the present invention there may be provided an arithmetic unit for processing a plurality of partial products, said unit comprising a plurality of carry save adder circuits as claimed in any preceding claim, wherein the inputs to each of said carry save adder circuits are provided by said plurality of partial products.

BRIEF DESCRIPTION OF THE DRAWINGS

For a better understanding of the present invention and as to how the same may be carried into effect, reference will now be made by way of example to the accompanying drawings in which.

DESCRIPTION OF THE PREFERRED EMBODIMENTS

Figure 1:
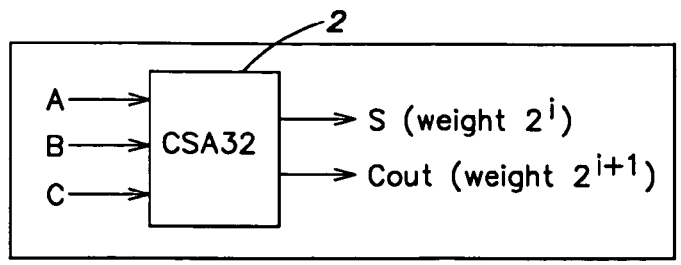
FIG. 1 shows a 3 to 2 carry save adder.

Reference will first be made to FIG. 1 which shows a conventional 3 to 2 carry save adder 2. It should be appreciated that carry save adders are sometimes referred to as compressors. The carry save adder 2 of FIG. 1 is a conventional full adder and has three inputs A, B and C. Inputs A, B and C are to be added together. The carry save adder 2 of FIG. 1 has two outputs S and Cout. The first output S is the sum output and the second output Cout is the carry output. The first output S represents the least significant bit of the sum of A and B and C whilst the second output Cout represents the most significant bit of the sum of A and B and C.

The truth table for the carry save adder of FIG. 1 is as follows:

| A | B | C | S | Cout |
|---|---|---|---|------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Figure 2:
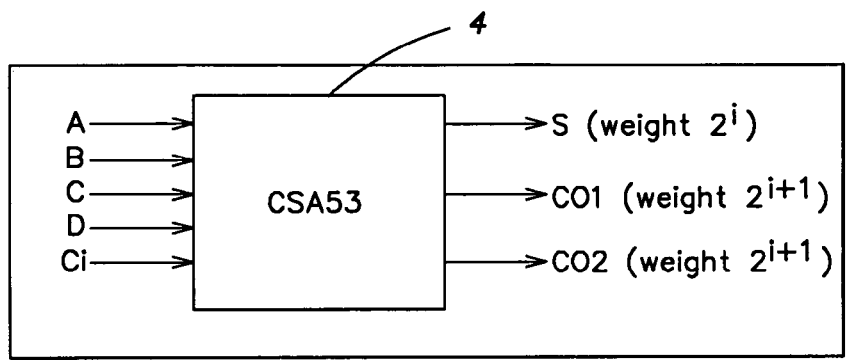
FIG. 2 shows a 5 to 3 carry save adder.

FIG. 2 shows a 5 to 3 carry save adder. As mentioned hereinbefore, this carry save adder is sometimes referred to as a 4 to 2 carry save adder. The carry save adder 4 of FIG. 2 has five inputs, inputs A, B, C, D and CI. A, B, C and D are to be added together along with CI which represents a carry input. Where a number of adders are connected, the input CI will be provided by the output of a preceding carry save adder.

The carry save adder 4 of FIG. 2 has three outputs, the first output S, the second output C01 and the third output C02. The first output S, which is the sum output, represents the least significant bit of the sum of A+B+C+D+CI. The other two output signals C01 and C02 are the carry signals. These carry out signals are same as the carry out signals for a full adder except that there are two carry out signals which have the same significance ($2^{i+1}$ if the inputs have the significance $2^i$).

Figure 4:
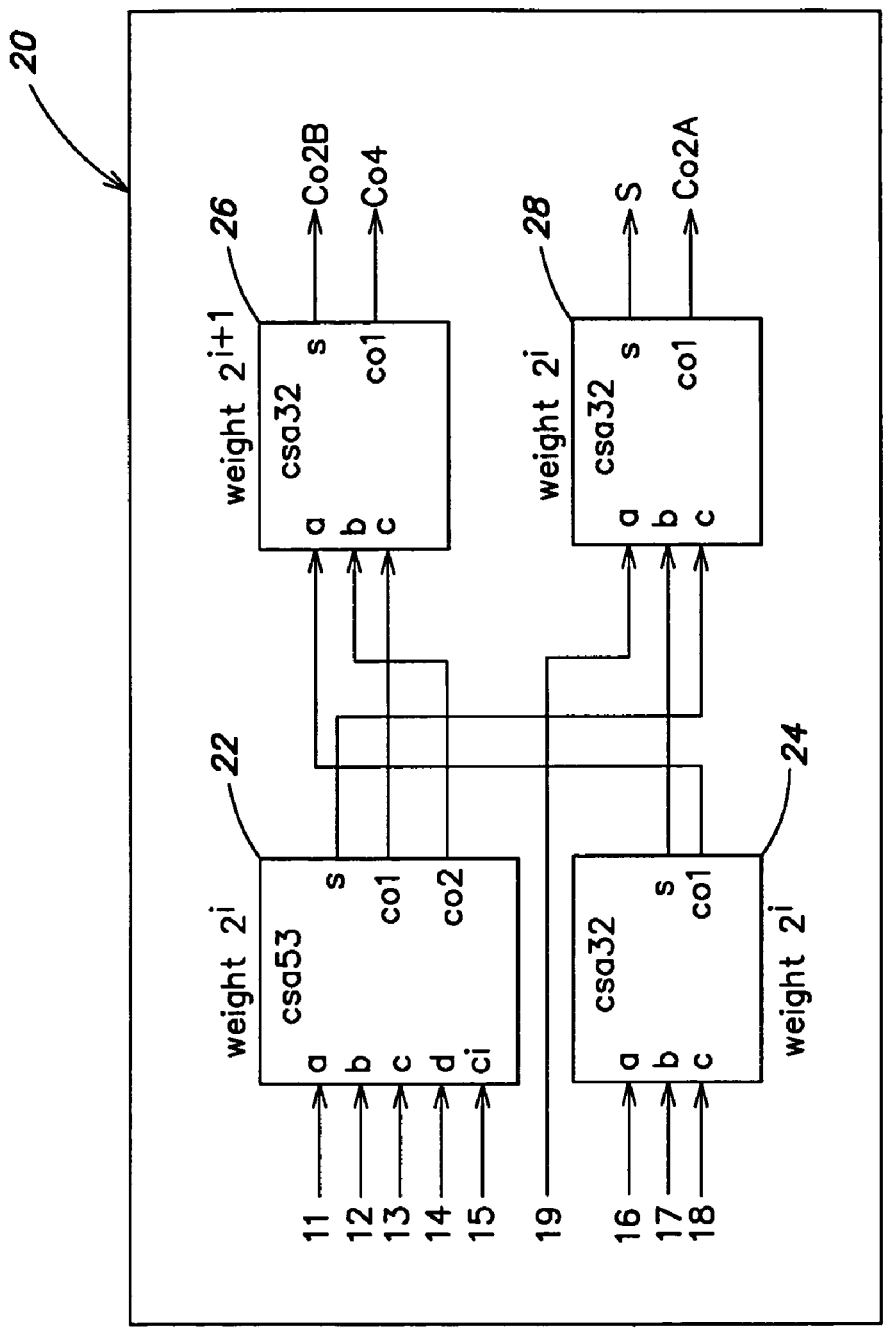
FIG. 4 shows a 9 to 4 carry save adder embodying the present invention.

Reference is now made to FIG. 4 which shows a 9 to 4 carry save adder 20 embodying the present invention. The carry save adder 20 embodying the present invention comprises first to fourth carry save adders 22 to 28 respectively. The first carry save adder 22 is a 5 to 3 carry save adder of the type shown in FIG. 2. The second, third and fourth carry save adders 24, 26 and 28 are 3 to 2 carry save adders or full adders as shown in FIG. 1.

The first carry save adder 22 receives the first five inputs I1–I5. These first five inputs represent bits from the first to fifth partial products. The second carry save adder 24 receives the sixth, seventh and eighth inputs I6, I7 and I8 representing bits from the sixth to eighth partial products.

The sum output S of the first carry save adder 22 provides the third output c of the fourth carry save adder 28. The first carry output C01 of the first carry save adder 22 provides the third input c of the third carry save adder 26. The second carry output C02 of the first carry save adder 22 provides the second input b of the third carry save adder 26.

The sum output S of the second carry save adder 24 provides the second input b of the fourth carry save adder 28. The carry output C01 of the second carry save adder 24 provides the first input a of the third carry save adder.

The third carry save adder 26 therefore receives all three of its inputs a to c from the outputs of the first and second carry save adders 22 and 24. The fourth carry save adder 28 thus has its second and third inputs b and c provided by the outputs of the first and second carry save adders 22 and 24. The first input a of the fourth carry save adder 28 is provided by the ninth input I9 from the ninth partial product.

The fourth carry save adder 28 provides a sum output S (significance $2^i$) and a first carry C02A of significance $2^{i+1}$. The third carry save adder 26 generates a second carry C02B of significance $2^{i+1}$ and a third carry C04 of significance $2^{i+2}$. This assumes that each of the inputs I1 to I9 have a $2^i$ significance.

It should be appreciated that the interconnections described in relation to FIG. 4 is only one way of achieving the required function. For example the inputs of cell 26 can be swapped or the inputs of the cell 28 can be swapped.

The carry save adder 20 of FIG. 4 has two inputs which are faster than the others. This has the advantage that when some of the partial products are generated later compared to others, the partial products which are generated later can be input to the faster inputs. In this way the timing differences between the partial products can be reduced or avoided. The ninth input I9 is fastest as it crosses only one cell or carry save adder. The fifth input I5 which is the carry input CI to the first carry save adder 22 is also faster than the other inputs to that same carry save adder or to the second carry save adder 24. This will be discussed in more detail in relation to FIG. 8 later.

In preferred embodiments of the present invention, the carry save adder 20 can be laid out in such a way as to reduce the number of wires crossing large distances. This is because there are only four cells and they can be arranged next to each other in a compact arrangement. With this arrangement the routing problems can be reduced as compared to structures such as the Wallace tree.

Figure 5:
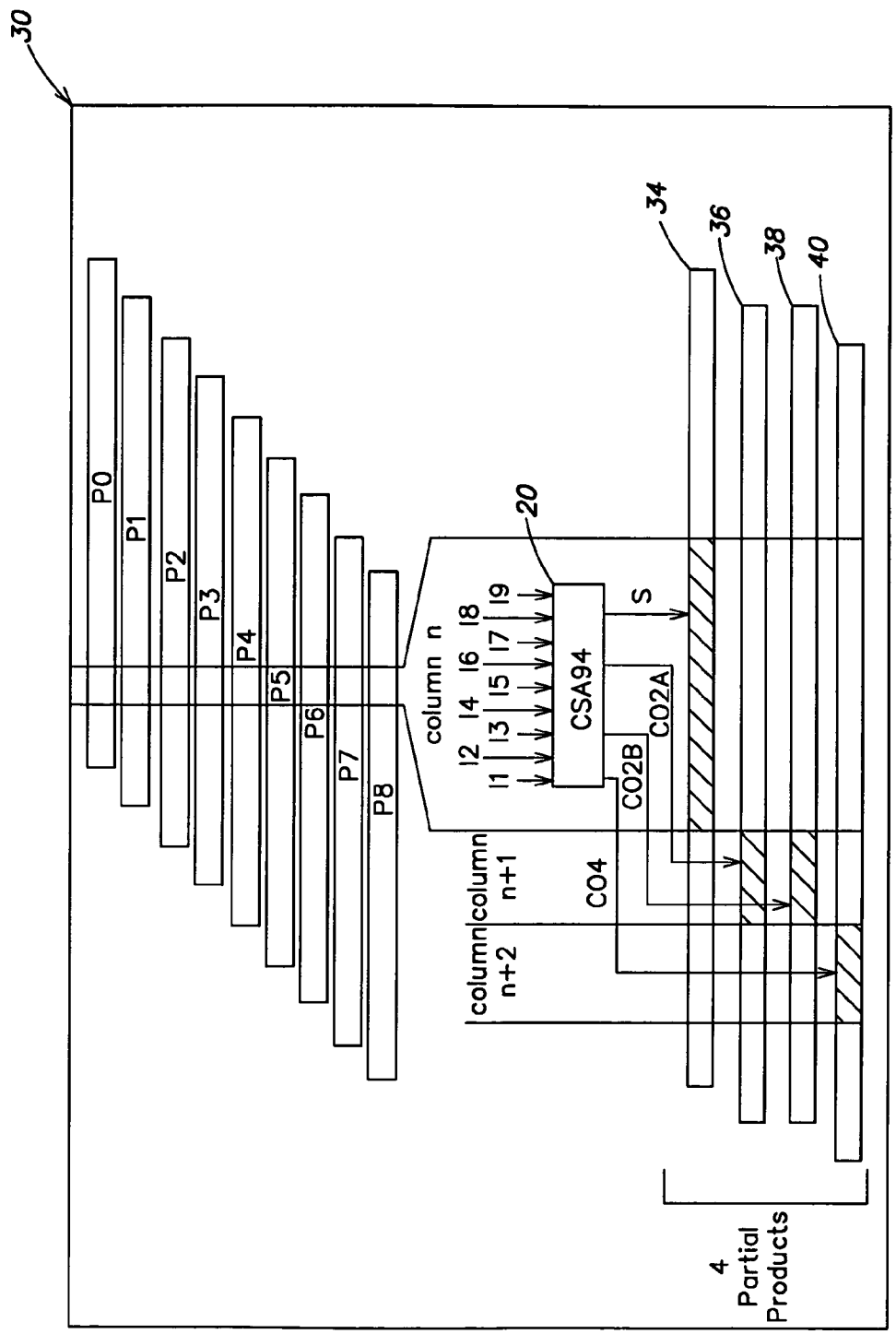
FIG. 5 shows a arithmetic unit embodying the present invention.

Reference is made to FIG. 5 which shows a context in which the carry save adder 20 of FIG. 4 can be used.

In the embodiment shown in FIG. 4, a further carry save adder may be added. This further carry save adder may be a 4 to 2 carry save adder which generates two partial products. This 4 to 2 carry save adder will receive four bits of the same significance. Assuming that the carry save adder deals with bits of significance the carry save adder will receive S from column I, the output C02A and C02B from the previous column I-1 and the output C04 from the column I-2.

FIG. 5 shows an arithmetic unit 30 which is arranged to multiply two numbers, X and Y together. Y is the multiplier in this case. Y has 17 bits and is subject to Booth coding. Y represents a 16 bit number with the $17^{th}$ bit being a 1-bit extension: sign extension if the 16 bit data is signed, 0 extension if it is unsigned. This enables Y to be considered as a 17 bit signed data indicating if the data is signed or unsigned. The Booth coding of the Y value results in outputs which are used to modify the X values. As mentioned hereinbefore, Booth coding allows the number of partial products to be reduced. For example, if Y is 17 bits long, nine partial products will result from the multiplication of those two numbers, if Booth coding is used. The nine partial products are referred to by references P0 to P8.

Each partial product P0 to P8 has n bits. One bit from each of the partial products is input to the carry save adder 20 of FIG. 4. If the mth bit of the first partial product P0 is selected, the m-2$^{th}$ bit will be selected from the second partial product P1, the m-4$^{th}$ bit selected from the third partial product P2 and so on. In this scenario, the first bit in a given partial product is the least significant bit whilst the nth bit in the partial product is the most significant bit. In certain cases, there will be no bits available. For example, if m=4, the corresponding bit from the fourth partial product P3 would be m=2. This gives a negative value. In these circumstance the value zero would be taken as the input to the carry save adder. Effectively the values of the partial products are offset so as to take into account the significance or weight of each of the partial product.

The number of carry save adders 20 which are provided is defined by the following equation:

number of bits=$n$+2(p−1) where n is the number of bits in each partial products p is the number of partial products.

As discussed above, there are not always 9 bits. For example column 5 only has three bits. In those circumstances it is not necessary to use the 9 to 4 adder. Instead, a 3 to 2 carry save adder can be used. Accordingly, the carry save adder for each column can be selected in accordance with the number of bits which are to be added.

Each carry save adder provides four outputs as discussed in relation to FIG. 4. The sum output S of the third carry save adder 26 provides one bit of a first partial product 34, the second output C02A of the third carry save adder 26 provides one bit of a second partial product 36, the first output C02B of the fourth carry save adder 28 provides one bit of the third partial product 38 and the second output C04 of the fourth carry save adder 28 provides one bit of a fourth partial product 40. The first output of the carry save adder 20 provides the mth position of the first partial product 34. The second and third outputs C02A and C02B provide the m+1 th positions of the second and third partial products 36 and 38. The fourth output of the carry save adder C04 provides the m+2 th position of the fourth partial product 40. The positions to which the outputs of the carry save adder 20 are provided in the respective partial products 34 to 40 reflects their significance or weight. The outputs of adjacent carry save adders are at adjacent locations in the partial products 34 to 40.

These four partial products 34 to 40 which receive the outputs of the carry save adder 20 are input to respective 4 to 2 adders which reduce the number of partial products to two. These two partial products can then be summed to provide a single result.

Figure 6:
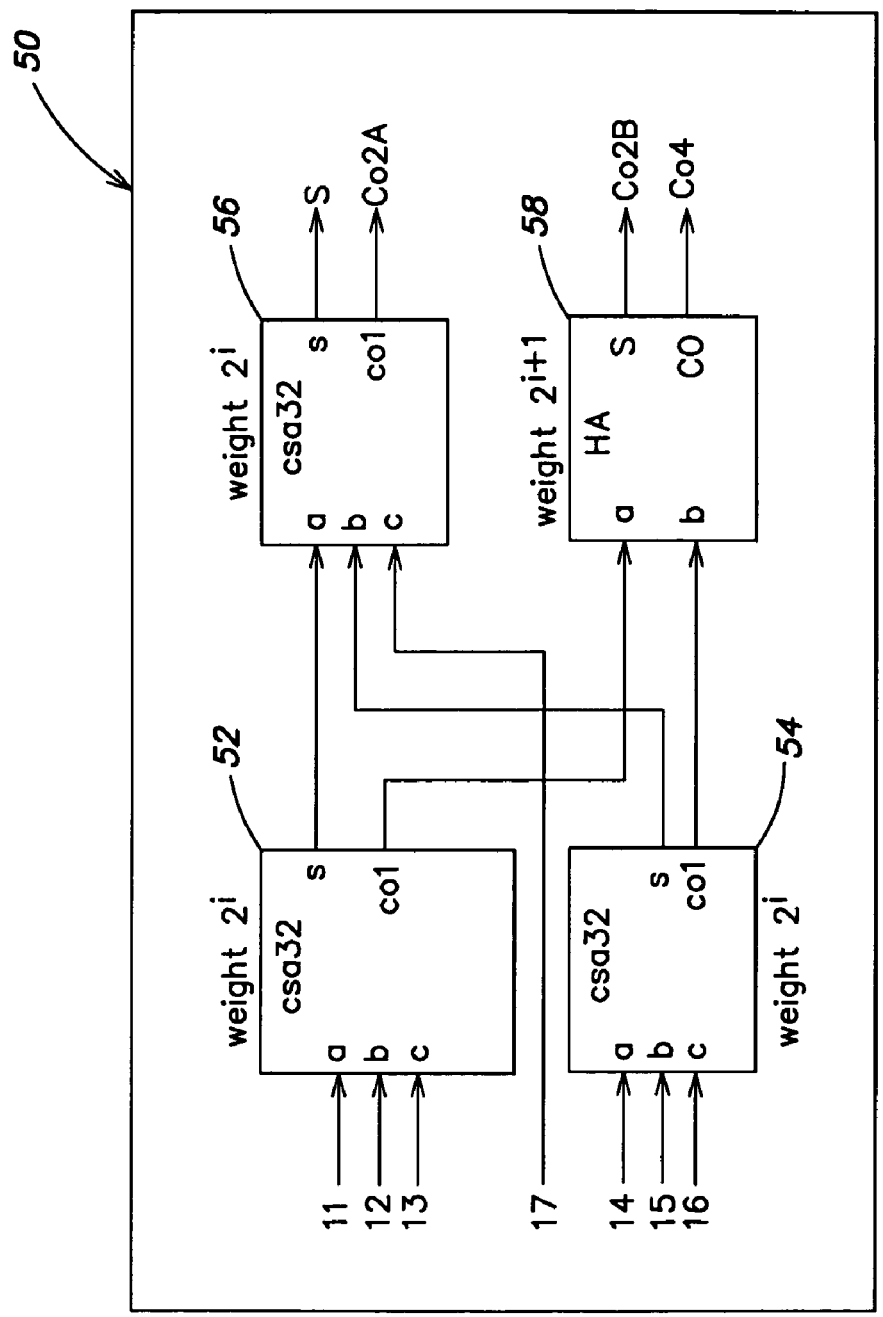
FIG. 6 shows a 7 to 4 carry save adder embodying the present invention.

Reference in now made to FIG. 6 which shows a 7 to 4 carry save adder 50. The 7 to 4 carry save adder 50 comprises four carry save adders 52 to 58. The first, second and third carry save adders 52 to 56 are 3 to 2 adders, such as illustrated in FIG. 1. The fourth carry save adder 58 is a half adder which receives two inputs and provides two outputs.

The first carry save adder 52 receives the first to third inputs 11, 12 and 13. The second carry save adder 54 receives the fourth fifth and sixth inputs 14, 15 and 16. The sum output S of the first carry save adder 52 provides the first input a to the third carry save adder 56. The sum output of the second carry save adder 54 provides the second input b to the third carry save adder 56. The third input to the third carry save adder 56 is provided by the seventh input 17.

The fourth carry save adder 58 receives the carry output C01 of the first and the second carry save adders which provide the first and second inputs a and b respectively.

The output of the third carry save adder provides the output S as its sum output and the output C02A as its carry output. The sum output of the fourth carry save adder 58 provides the second carry output C02B output whilst the carry output of the fourth carry save adder 58 provides the carry output C04. These outputs have the same significance or weight as those outputs of the 9 to 4 carry save adder shown in FIG. 4.

The seventh input 17 is faster than the other inputs in that it only has to pass through one of the carry save adders. The first and second carry save adders 52 and 54 receive the first six inputs 11 to 16. The first and second carry save adders 52 and 54 effectively provide a first layer. The third carry save adder 56 and the half adder 58 provide a second layer and receive the respective outputs from the first layer as well as the seventh input 17. In practice, the adders making up the carry save adder of FIG. 6 can be arranged in any suitable way so as to minimise the length of the connections as with the embodiment described in relation to FIG. 4.

The carry save adder of FIG. 6 can also be used in a similar context to that shown in FIG. 5 if seven partial products are generated, particularly if seven bits are to be processed in a column. The carry save adder can also be used in the embodiment shown in FIG. 5 where there are more than seven partial products but only seven bits are provided for a given column.

It should be noted that, as with the carry save adder of FIG. 4, some of the interconnections between the carry save adders making up the 7 to 4 carry save adder can be altered without altering the function of the adder as a whole. For example the inputs to the third carry save adder 56 can be swapped with other inputs to that carry save adder. Likewise the inputs to the half adder 58 can be swapped around.

Again a 4 to 2 carry save adder can be provided to reduce the number of partial products to two.

The arrangement of both the 9 to 4 and the 7 to 4 carry save adders allow short routings to be achieved between the carry save adders. This improves both timing and routing of these carry save adders. This is particularly advantageous when embodiments of the present invention are incorporated in an integrated circuit.

Figure 3:
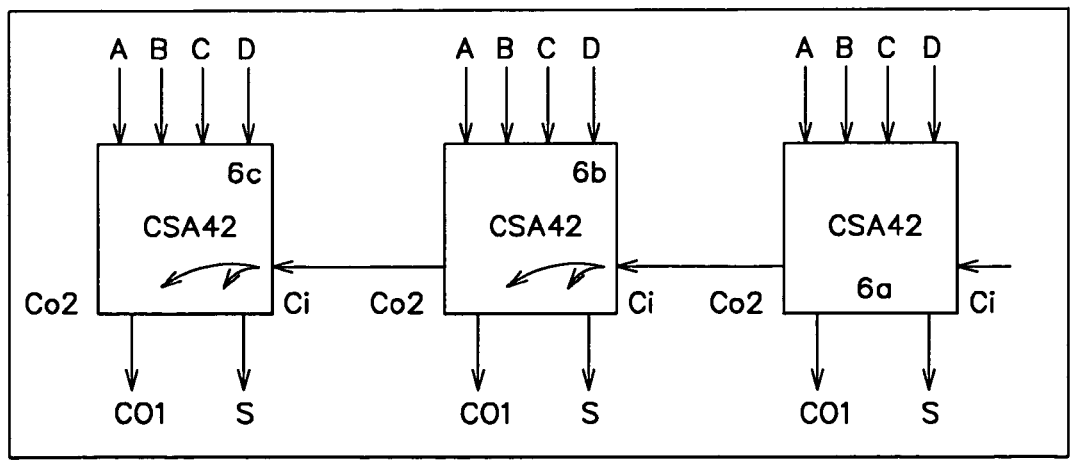
FIG. 3 shows three 5 to 3 carry save adders connected together in series and used as 4 to 2 carry save adders.

Reference is made to FIG. 3 which shows three of the carry save adders 6a, 6b and 6c of FIG. 2 connected together. Each of the 5 to 3 carry save adders 6 receives inputs A to D and the input CI from the preceding carry save adder and provides three outputs as in FIG. 2. The first carry save adder block 6a receives a carry input CI from a preceding carry save adder. If there is no previous carry save adder, then input CI will be zero. The first carry save adder 6a outputs the second carry output C02 to the second carry save adder 6b. This second carry output C02 from the first carry save adder is the carry input CI to the second carry save adder 6b. Likewise, the second carry save adder 6b provides its second carry output C02 as the carry input CI to the third carry save adder 6c. It should be noted that the input CI is not used to generate the C02 output of the same carry save adder.

This means that the carry propagation is only done from one carry save adder to the next. The respective inputs A to D to each of the carry save adders 6 may represent adjacent bits from four partial products. For example, the first carry save adder 6a receives the nth bit of first, second, third and fourth partial products with the second and third carry save adders 6b and c receiving the n+1 and n+2 bits respectively of those same partial products.

FIG. 3 illustrates why the 5 to 3 carry save adder is sometimes referred to as the 4 to 2 carry save adder. In particular four inputs A, B, C and D are reduced to two outputs S and C01.

Figure 7:
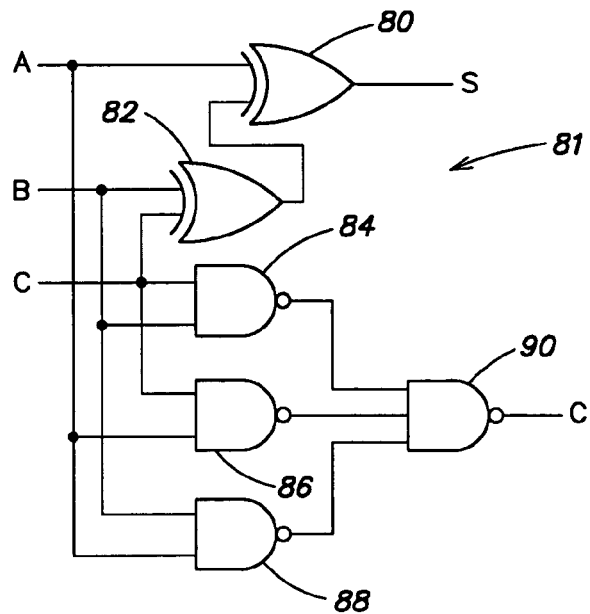
FIG. 7 shows one possible structure of a 3 to 2 carry save adder.

Reference will now be made to FIG. 7 which shows a structure of a 3 to 2 carry save adder 81. The carry save adder 81 has three inputs A, B and C. The carry save adder 81 has first and second exclusive OR gates 80 and 82 and first to fourth NAND gates 84 to 90. The first exclusive OR gate 80 receives the first input A and the output of the second exclusive OR gate 82. The output of the first exclusive OR gate 80 provides the sum output S.

The second exclusive OR gate 82 receives the second and third inputs B and C as its two inputs.

The first NAND gate 84 receives an input from the second and third inputs B and C. The second NAND gate 86 receives its input from the first and third inputs A and C whilst the third NAND gate 88 receives its inputs from the first and second inputs A and B. The output of each of the first to third NAND gates 84 to 88 provide the inputs to the fourth NAND gate 90, the output of which provides the carry output C.

Figure 8:
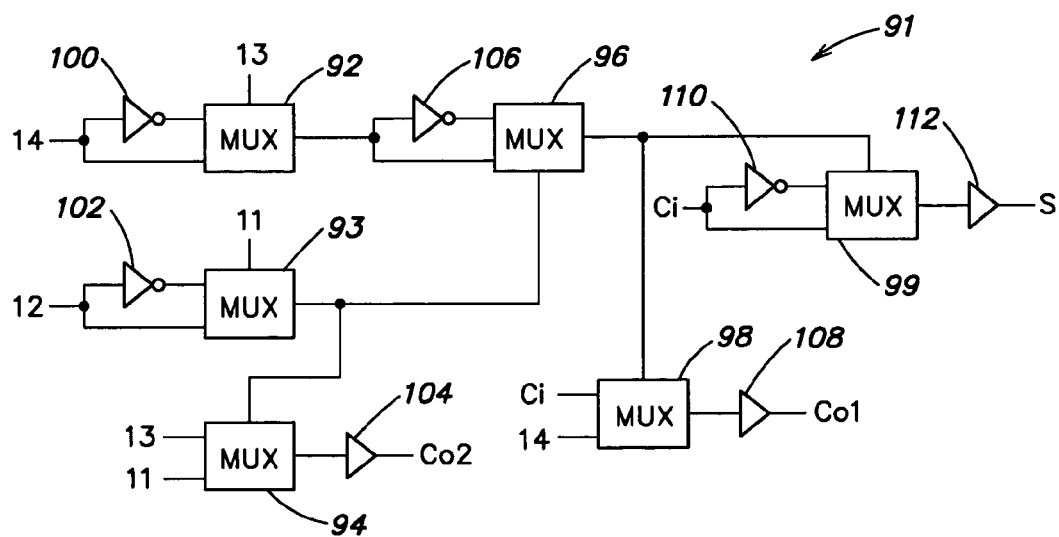
FIG. 8 shows one possible structure of a 5 to 3 carry save adder.

Reference is made to FIG. 8 which shows one possibility for the 5 to 3 carry save adder 91.

Figure 9:
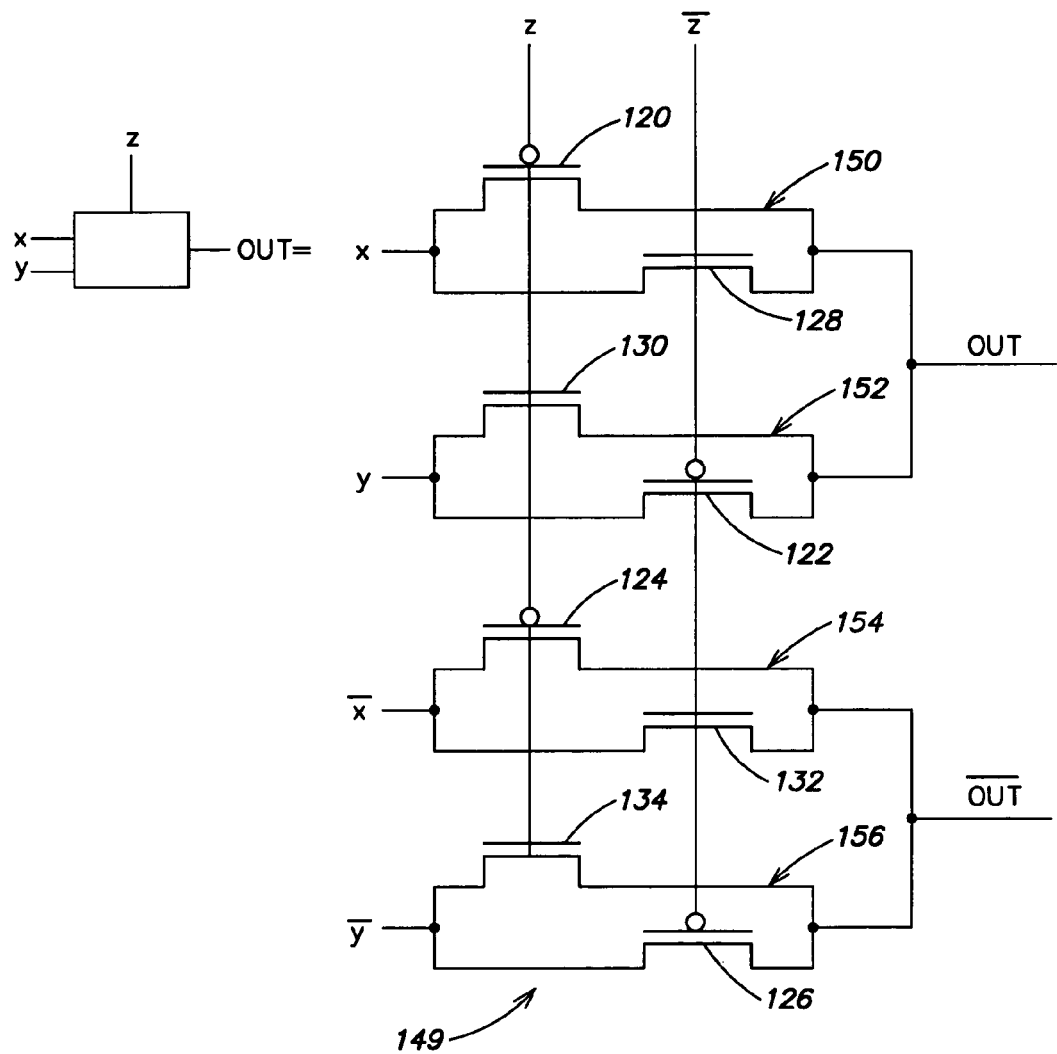
FIG. 9 shows the construction of the multiplexers of FIG. 8 in more detail.

The 5 to 3 carry save adder 91 comprises six multiplexers 92, 93, 94, 96, 98 and 99 each of which has the construction shown in FIG. 9. The first multiplexer 92 receives the fourth input 14 and its inverse. An inverter 100 is provided for inverting the fourth input 14. The first multiplexer 92 also receives the third input 13 as a select signal.

The second multiplexer 93 receives the second signal 12 and its inverse. A second inverter 102 is provided for inverting the second input 12. The select signal is provided by the first input 11. The third multiplexer 94 receives the first and third inputs 11 and 13 and the output of the second multiplexer 93 provides its select signal. The output of the third multiplexer 94 is input to a first buffer 104. The output of the first buffer 104 provides the second carry output C02.

The fourth multiplexer 96 receives the output of the first multiplexer 92 and its inverse. A third inverter 106 is provided for inverting the output of the first multiplexer 92. The output of the second multiplexer 93 provides the select signal for the fourth multiplexer 96.

The fifth multiplexer 98 receives the carry input Ci and the fourth input 14 as inputs and the output of the fourth multiplexer 96 as the select signal. The output of the fifth multiplexer 98 is input to a second buffer 108, the output of which provides the first carry output C01.

The final multiplexer 99 receives the carry input Ci and its inverse. A fourth inverter 110 is provided to provide the inverse of the carry input Ci. The select signal is provided by the output of the fourth multiplexer 96. The output of the sixth multiplexer is input to a third buffer 112, the output of which provides the sum output S.

The arrangement of FIG. 8 shows that the input Ci has less gate levels to cross that the inputs I1, I2, I3 and I4 and is therefore faster than these latter inputs.

Reference is made to FIG. 9 which shows the construction of the multiplexers of FIG. 8 in more detail. The inputs to the multiplexer 149 are X and Y whilst the select signal is Z. The multiplexer 149 comprises four pairs of transistors 150 to 156. Each pair of transistors comprises a p-type transistor 120 to 126, and a n-type transistor 128 to 134 respectively.

In the first pair of transistors 150, the p-type transistor 120 receives the select signal Z whilst the n-type transistor 128 receives the inverse of the select signal Z. This arrangement also applies to the third pair of transistors 154 comprising of the third p-type transistor 124 and the third n-type transistor 132.

The second and fourth pairs of transistors 152 and 156 are such that the n-type transistors 130 and 134 receive the select signal Z whilst the p transistors 124 and 126 respectively receive the inverse of the select signal Z.

The circuitry for the carry save adders is by way of example only and any other suitable circuitry can be used.

Embodiments of the present invention may be incorporated in a digital signal processor. Embodiments of the present invention may be incorporated in an integrated circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A carry save adder circuit for reducing the number of inputs to a lower number of outputs, said carry save adder circuit comprising four carry save adders, said four carry save adders being arranged in two layers with the first and second carry save adders being arranged in a first of said layers and the third and fourth carry save adders being arranged in a second of said layers, said third and fourth carry save adders being arranged to provide said outputs, two of the said outputs having a equal weight, said third and fourth carry save adders each receiving at least one output from each of said first and second carry save adders and the first and second carry save adders being arranged to receive at least some of said inputs;

wherein the carry save adder circuit is a 9 to 4 carry save adder circuit; and wherein the first carry save adder is a 5 to 3 carry save adder and the second, third and fourth carry save adders are 3 to 2 carry save adders.

2. A carry save adder circuit as claimed in claim 1, wherein at least one of said inputs is input to at least one of said third and fourth carry save adders.

3. A carry save adder circuit as claimed in claim 1, wherein the first to fifth inputs are input to the first carry save adder and the sixth to eighth inputs are provided to the second carry save adder.

4. A carry save adder circuit as claimed in claim 3, wherein the ninth input is input directly to one of the third and fourth carry save adders.

5. A carry save adder circuit as claimed in claim 1, wherein four outputs are provided, one of the outputs having a weight of $2^i$, two of the outputs having a weight of $2^{i+1}$, and one of the outputs having a weight of $2^{i+2}$.

6. A unit as claimed in claim 1, wherein there is no data propagation between the third and fourth carry save adders.

7. A carry save adder circuit for reducing the number of inputs to a lower number of outputs, said carry save adder circuit comprising four carry save adders, said four carry save adders being arranged in two layers with the first and second carry save adders being arranged in a first of said layers and the third and fourth carry save adders being arranged in a second of said layers, said third and fourth carry save adders being arranged to provide said outputs, two of the said outputs having a equal weight, said third and fourth carry save adders each receiving at least one output from each of said first and second carry save adders and the first and second carry save adders being arranged to receive at least some of said inputs;
   wherein the carry save adder circuit is a 7 to 4 carry save adder circuit; and
   wherein the first and third carry save adders are 3 to 2 carry save adders and the fourth carry save adder is a half adder.

8. A carry save adder circuit as claimed in claim 7, wherein the first and third inputs are input to the first carry save adder and the fourth to sixth inputs are provided to the second carry save adder.

9. A carry save adder circuit as claimed in claim 8, wherein the seventh input is input directly to one of the third and fourth carry save adders.

10. A carry save adder circuit for reducing nine inputs for four outputs, said carry save adder circuit comprising four carry save adders, said four carry save adders being arranged in two layers with the first and second carry save adders being arranged in a first of said layers and the third and fourth carry save adders being arranged in a second of said layers, said third and fourth carry save adders being arranged to provide said outputs, two of the said outputs having a equal weight, said third and fourth carry save adders each receiving at least one output from each of said first and second carry save adders and the first and second carry save adders being arranged to receive at least some of said inputs, the first carry save adder being a 5 to 3 carry save adder and the second, third and fourth carry save adders being 3 to 2 carry save adders.

11. A carry save adder circuit as claimed in claim 10, wherein the first carry save adder receives five inputs, the second carry save adder receives three inputs, one of the third and fourth carry save adders receives an input and the sum output of the first and second carry save adders, the carry outputs of the first and second carry save adders being connected to the other of the third and fourth carry save adders.

12. A carry save adder circuit for reducing seven inputs to four outputs, said carry save adder circuit comprising four carry save adder units, said four carry save adders being arranged in two layers with the first and second carry save adders being arranged in a first of said layers and the third and fourth carry save adders being arranged in a second of said layers, said third and fourth carry save adders being arranged to provide said outputs, two of the said outputs having a equal weight, said third and fourth carry save adders each receiving at least one output from each of said first and second carry save adders and the first and second carry save adders being arranged to receive at least some of said inputs, the first, second and third carry save units being 3 to 2 carry save adders and the fourth carry save adder being a half adder.

13. A carry save adder circuit as claimed in claim 12, wherein the first and second carry save adders each receive three inputs, one of the third and fourth carry save adders receiving an input and the sum outputs of the first and second carry save adders, the carry output of the first and second carry save adders being connected to the other of the third and fourth carry save adders.

14. An arithmetic unit for processing a plurality of partial products, said unit comprising a plurality of carry save adder circuits, each said carry save adder circuit being arranged to reduce nine inputs to four outputs, said carry save adder circuit comprising four carry save adders, said four carry save adders being arranged in two layers with the first and second carry save adders being arranged in a first of said layers and the third and fourth carry save adders being arranged in a second of said layers said third and fourth carry save adders each receiving at least one output from each of said first and second carry save adders, the first carry save adder being a 5 to 3 carry save adder and the second, third and fourth carry save adders being 3 to 2 carry save adders, wherein the inputs to each of said carry save adder circuits are provided by said plurality of partial products.

15. A unit as claimed in claim 14, wherein there is no carry output provided from the output of the first layer of each carry save adder to an adjacent carry save adder.

16. An arithmetic unit as claimed in claim 14, wherein no signal is received by the second layer of each carry save adder from an adjacent carry save adder.

17. A unit as claimed in claim 14, wherein the number of bits from the respective partial products is the same or less than the number of inputs to the respective carry save adder circuit processing said respective bits.

18. An arithmetic unit for processing a plurality of partial products, said unit comprising a plurality of carry save adder circuits each said carry save adder circuit, being arranged to reduce seven inputs to four outputs, said carry save adder circuit comprising four carry save adder units, said four carry save adders being arranged in two layers with the first and second carry save adders being arranged in a first of said layers and the third and fourth carry save adders being arranged in a second of said layers said third and fourth carry save adders each receiving at least one output from each of said first and second carry save adders, the first, second and third carry save units being 3 to 2 carry save adders and the fourth carry save adder being a half adder, wherein the inputs to each of said carry save adder circuits are provided by said plurality of partial products.

19. A unit as claimed in claim 18, wherein there is no carry output provided from the output of the first layer of each carry save adder to an adjacent carry save adder.

20. An arithmetic unit as claimed in claim 18, wherein no signal is received by the second layer of each carry save adder from an adjacent carry save adder.

21. A unit as claimed in claim 18, wherein the number of bits from the respective partial products is the same or less than the number of inputs to the respective carry save adder circuit processing said respective bits.

* * * * *

UNITED STATES PATENT AND TRADEMARK OFFICE
CERTIFICATE OF CORRECTION

PATENT NO. : 7,111,033 B2
APPLICATION NO. : 09/919495
DATED : September 19, 2006
INVENTOR(S) : Sebastien Ferroussat It is certified that error appears in the above-identified patent and that said Letters Patent is hereby corrected as shown below:

Column 1, line 51 should read:
    of one sum bit and two carry bits. One of these carry bits is Column 5, line 12 should read:
    circumstances the value zero would be taken as the input to
        line 53 should read:
    Reference is now made to FIG. 6 which shows a 7 to 4

Signed and Sealed this

Seventeenth Day of July, 2007

JON W. DUDAS
*Director of the United States Patent and Trademark Office*